United States Patent [19]

Ishiguro

[11] Patent Number: 4,967,215
[45] Date of Patent: Oct. 30, 1990

[54] AUTOMATIC FILM REWINDING APPARATUS IN A CAMERA

[75] Inventor: Yasuaki Ishiguro, Fujimi, Japan
[73] Assignee: Nikon Corporation, Tokyo, Japan
[21] Appl. No.: 400,273
[22] Filed: Aug. 28, 1989
[30] Foreign Application Priority Data
  Sep. 1, 1988 [JP] Japan .................................. 63-216221
[51] Int. Cl.$^5$ .............................................. G03B 1/18
[52] U.S. Cl. ................................................ 354/173.1
[58] Field of Search ................ 354/173.1, 173.11, 214, 354/288

[56] References Cited
U.S. PATENT DOCUMENTS 4,145,011  3/1979  Date .............................. 354/173.1 X
4,149,793  4/1979  Date .................................... 354/214
4,340,290  7/1982  Matsukawa et al. ............. 354/173.1
4,707,095  11/1987 Nakano et al. .................. 354/173.11

Primary Examiner—Brian W. Brown
Attorney, Agent, or Firm—Shapiro and Shapiro

[57] ABSTRACT

An automatic rewinding apparatus in a camera has a first operating member movable from an initial position to an operating position to place a film-winding sprocket in a freely rotatable state, and a second operating member movable from an initial position to an operating position to activate a drive mechanism for rewinding film into a film cartridge via a coupling to the spool shaft of the film cartridge. After film rewinding, a knob disengages the coupling from the spool shaft, returns the second operating member to its initial position, and releases a back lid of the camera, which returns the first operating member to its initial position.

4 Claims, 2 Drawing Sheets

4,967,215

AUTOMATIC FILM REWINDING APPARATUS IN A CAMERA

BACKGROUND OF THE INVENTION

1. Field of the Invention

This invention relates to a rewinding apparatus in a camera.

2. Related Background Art

There is a conventional apparatus of this kind which, as shown, for example, in U.S. Pat. No. 4,340,290, is comprised of a first operating member movable to a first position for connecting a winding-up mechanism and a winding-up sprocket together for rewinding of a film and a second position for cutting off the connection between the two, and a second operating member movable to a third position for disconnecting the film cartridge shaft and a rewinding drive system and a fourth position for connecting the two together. This device permits the movement of the second operating member to the fourth position only when the first operating member is placed in the second position.

The rewinding apparatus of the structure as described above is simple in structure and permits the rewinding operation to be carried out after two operations are performed and therefore, it rarely happens that the photographer commits the error of rewinding the film by mistake. However, it has been necessary that of the operating members set to the rewinding condition, at least the second operating member be manually returned at a point of time whereat the rewinding of the film has been completed or when the film is interchanged and the new film is wound up.

SUMMARY OF THE INVENTION

The present invention, intends to provide a rewinding apparatus in a camera which is improved in operability.

The automatic rewinding apparatus in a camera according to the present invention is characterized by the provision of a knob on a shaft having at one end thereof a coupling to the spool shaft of a film cartridge and movable between a position in which said coupling is engaged with the spool shaft and a position in which said coupling is disengaged from the spool shaft, a back lid restraining mechanism operatively associated with said knob and restraining the back lid of the camera in its closed state when said knob is in said coupling engaged position and releasing said back lid when said knob is in said coupling disengaged position, thereby permitting the opening of said back lid, a first operating member movably operated from an initial position to an operating position to break the connection between a sprocket and a winding-up mechanism and bring said sprocket into a free state, a second operating member movably operated from an initial position to an operating position to render a motor operable, a rewinding mechanism for driving said spool shaft in the rewinding direction by the operation of said motor, first returning means responsive to the opening movement of said back lid to return said first operating member from its operating position to its initial position, and second returning means responsive to the movement of said knob from said coupling engaged position to said coupling disengaged position to return said second operating member from its operating position to its initial position.

The automatic rewinding apparatus according to the present invention is provided with the first returning means and the second returning means and thus, the releasing of the rewinding state is fully completed at a point of time whereat the back lid has been opened. Therefore, operability is improved. Also, the operating members are released by the movement of the knob to its coupling disengaged position and the opening movement of the back lid, and therefore, as compared with a case where the two operating members are released by the force of a single member, the force for returning the two operating members can be distributed facilitate returning the two operating members.

DESCRIPTION OF THE PREFERRED EMBODIMENT

The present invention will hereafter be described in greater detail with reference to the drawings.

Figure 1:
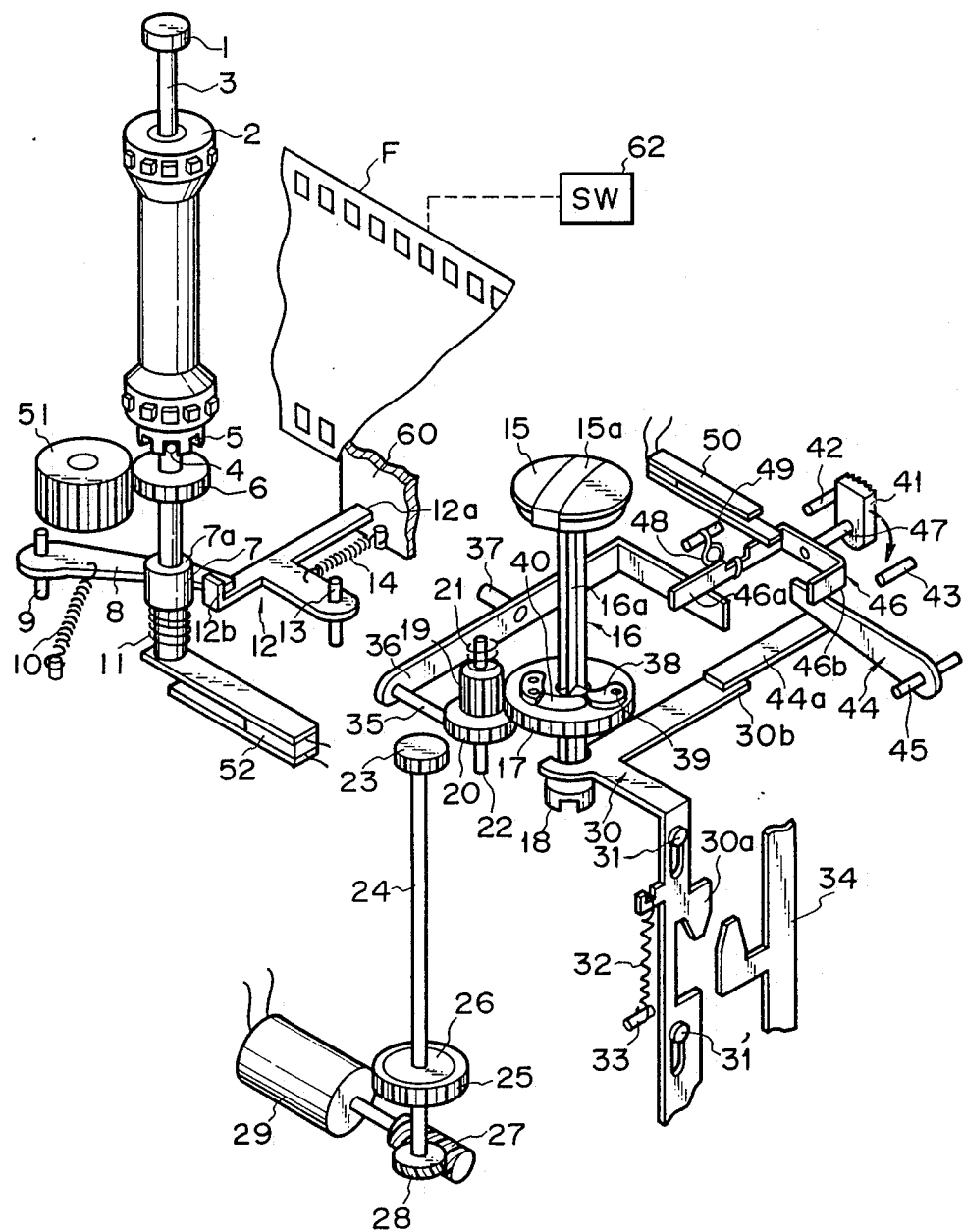
FIG. 1 is a perspective view showing an embodiment of an automatic rewinding apparatus according to the present invention.

FIG. 1 is a perspective view showing an embodiment of the automatic rewinding apparatus according to the present invention, and the state shown there is the rewinding state. A first operating member 1 is disposed coaxially with a sprocket 2. A gear 6 meshing with a winding-up system gear 51 which is a portion of a film winding-up mechanism is fixed to the shaft 3 of the first operating member 1 coaxially therewith. A thick stepped portion 7 is formed below the shaft 3, and a lever 8 is biased about a shaft 9 by a spring 10 and bears against the outer periphery of the stepped portion.

A lever 12 rotatable about a shaft 13 is biased clockwise by a spring 14, but has one end 12a thereof pressed by a portion 60 of the back lid of a camera and therefore, the inside of the bent portion 12b of the lever 12 does not bear against the lever 8. A switch 52 is adapted to be closed by the first operating member 1 being depressed downwardly. A film rewinding drive system (a rewinding mechanism) includes a rewinding motor 29 connected to a power source, not shown, a worm 27, a worm wheel 28, a transmission gear 23 coupled integrally to the worm wheel 28 by a shaft 24, a gear 17, a gear 19 meshing with the gear 17, and a clutch gear 20 integral with the gear 19. The clutch gear 20 is slidable relative to a shaft 22, and is in non-meshing engagement with the transmission gear 23 when it is slid upwardly, and is in meshing engagement with the transmission gear 23 when it is slid downwardly.

A pawl 38 provided on the gear 17 for rotation about a shaft 39 is biased toward the axial groove 16a of a rewinding shaft 16 by a leaf spring 40, and forms a one-way clutch so that rotation is transmitted to the rewinding shaft 16 only when the rewinding shaft gear 17 is rotated clockwise.

A rewinding fork 18 meshing with the key of the spool shaft of a film cartridge, not shown, is fixed to the lower end of the rewinding shaft 16.

The gears 19 and 20 are biased downwardly by a coil spring 21. A pin 35 secured to a seesaw lever 36 bears against the lower end surface of the clutch gear 20.

The seesaw lever 36 is pivotable about a shaft 37, and the bent end portion thereof bears against the bent portion 46a of a lever 46, and the seesaw lever 36 pivots clockwise by the counter-clockwise rotation of the lever 46 about a shaft 47.

The bent portion 46a of the lever 46 is formed with a cut-away to which one end of a toggle spring 48 is secured. The other end of the toggle spring 48 is secured to a fixed pin 49.

A second operating member 41 is coupled to the lever 46 by the shaft 47.

Clockwise rotation of the lever 46 causes a switch 50 to be closed. Starting of the rotation of the rewinding motor 29 is accomplished by the closing of two switches 50 and 52.

A hook lever 30 constituting a back lid restraining mechanism with the hook 34 of the back lid of the camera is mounted on a body housing, not shown, for sliding movement in a vertical direction by pins 31 and 31'.

A coil spring 32 has one end thereof secured to the hook lever 30 and the other end secured to a fixed pin 33, and biases the hook lever 30 downwardly.

The hook 34 attached to the back lid is provided so as to come into engagement with the hook portion 30a of the hook lever 30.

The operation of the automatic film rewinding apparatus of the present invention constructed as described above will hereinafter be described.

When the first operating member 1 is depressed from its initial position against the biasing of a compression coil spring 11, a pin 4 secured to the shaft 3 lowers and comes out of a groove 5 formed in the lower end portion of the sprocket 2. Thereby the sprocket 2 is released from the engagement with the winding system and becomes free. Further, the lower end portion of the shaft 3 closes the switch 52.

When the stepped portion 7 lowers with the depression of the shaft 3, the lever 8 is rotated clockwise by the spring 10 to preclude upward movement of the shaft 3. Therefore, the depressed state of the first operating member 1 is maintained.

The operation of the second operating member 41 for rewinding is accomplished by this second operating member being rotated clockwise from its initial position shown.

When the second operating member 41 is rotatively operated in the direction of the arrow to a stop 43 against the biasing of the toggle spring 48, the end 46a of the lever 46 moves up. Thereby the seesaw lever 36 becomes pivotable counter-clockwise about the shaft 37. As a result, the gears 19 and 20 are guided downwardly on a shaft 22 by the downward biasing of the coil spring 21 and the clutch gear 20 comes into meshing engagement with the gear 23. At the same time, the clockwise rotation of the lever 46 closes the switch 50.

In a state in which a conventional switch 62 for detecting the presence of the film F is detecting the presence of the film, the rewinding motor 29 is rotatively driven in the rewinding direction by the closing of the switches 50 and 52 until the rewinding of the film is completed.

The rotation of the rewinding motor 29 is transmitted to the gear 23 by way of the worm 27 and the worm wheel 28. Since at this time, the gear 20 is in meshing engagement with the gear 23, the rotation is transmitted to the gear 20, and via the gear 19 formed integrally with the gear 20, the rewinding shaft gear 17 is rotated clockwise. The rotation of the rewinding shaft gear 17 is transmitted to the rewinding shaft 16 via one-way clutch 38, whereby the fork 18 at the lower end of the rewinding shaft is rotated clockwise and the spool shaft of the film cartridge, not shown, is rotated and thus, the film F is rewound into the cartridge. When a switch 62 is opened by the rewinding of the film being completed, the rewinding motor 29 stops its rotation. Thereby, the rewinding is terminated.

When the knob 15 is pulled up, the fork 18 moves up through the intermediary of the rewinding shaft 16 secured to the knob 15. One end of the hook lever 30 is positioned at the upper end of the fork 18, and by the upward movement of the rewinding fork 18, the hook lever 30 is moved up against the force of the spring 32.

The bent portion 44a of the lever 44 is opposed to above the other end 30b of the hook lever 30, and due to the upward movement of the hook lever 30, the other end 30b of the hook lever 30 bears against the bent portion 44a, whereafter it further biases the bent portion 44a upwardly and therefore, the lever 44 rotates clockwise about the shaft 45 and the end thereof pushes the bent portion 46b of the lever 46 upwardly. Therefore, the lever 46 rotates counter-clockwise against the biasing of the toggle spring 48. The second operating member 41 returns to its initial position shown, and the switch 50 is opened. The hook portion 30a of the hook lever 30 is released from the engagement with the back lid hook 34 and the back lid 60 opens. The fork 18 is released from the engagement with the shaft of the film cartridge and thus, removal of the film becomes possible.

When the back lid 60 opens, the contact between the back lid and the end 12a of the lever 12 is released and the lever 12 is rotated clockwise by the spring 14. Thus, the bent portion 12b bears against the fore end portion of the lever 8 to pivot the lever 8 counter-clockwise. Consequently, the shaft 3 is moved up by the biasing force of the compression coil 11 and the pin 4 comes into engagement with the groove 5. Also, the switch 52 becomes open.

The one-way clutch 26 transmits the rotation of the shaft 24 to the gear 25 when the rewinding motor 29 is rotated in the direction opposite to the direction during rewinding, thus enabling the rewinding motor 29 to be used for other purposes than rewinding.

The one-way clutch 38 protects against malfunctioning during the rotation of the rewinding motor 29 in the direction opposite to the direction during rewinding.

Figure 2:
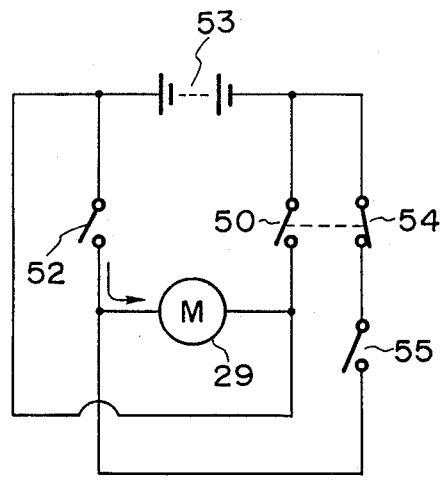
FIG. 2 is a circuit diagram of the embodiment of the present invention.

FIG. 2 is a circuit diagram of the embodiment of the present invention. The motor 29 is rotated in a forward direction by an electric current flowing from a battery 53 to the motor 29 in the direction of arrow when the switches 50 and 52 are closed.

Switch 55 is a switch which operates when the motor 29 is used for other purposes than rewinding, and when the switch 55 is closed, the electric current flows in a reverse direction and the motor 29 is rotated in a reverse direction.

Switch 54 is a switch operatively associated with the switch 50, and is opened when the switch 50 is closed.

A crank 15a (FIG. 1) is housed in the knob 15. By cocking up the crank 15a and rotating it clockwise after the first operating member 1 is operated, manual rewinding can also be accomplished.

In the foregoing description, it has been described that after the first operating member has been operated, the second operating member is operated to effect the rewinding operation, but in the above-described embodiment, it is also possible to operate the first operating member after the second operating member has been operated. That is, either of the first and second operating members may be operated first during rewinding.

While an embodiment of the automatic rewinding apparatus according to the present invention has been described with reference to the drawings, the present invention is not restricted to the above-described embodiment, but may of course be changed or improved without departing from the gist of the invention. For example, the knob 15 is adapted to be operated upwardly, but alternatively, it may be designed to be operated downwardly.

I claim:

1. A camera including a film winding mechanism having a sprocket for winding film from a spool shaft of a film cartridge, a back lid that is opened to load and unload said film cartridge and that is held closed by a releasable restraining mechanism, and drive means having a coupling adapted to be engaged with the spool shaft for rewinding film thereon, and comprising:

first operating means operable from an initial position to an operating position to render said sprocket free from said film winding mechanism;

second operating means operable from an initial position to an operating position to activate said drive means;

a member operable to disengage said coupling from said spool shaft and to release the holding of said back lid by said restraining mechanism;

means for returning said first operating member to its initial position in association with the release of the holding of said back lid by said restraining mechanism; and means for returning said second operating member to its initial position in response to the operation of said member.

2. A camera including drive means having a coupling adapted to be engaged with a spool shaft of a film cartridge for rewinding film, and a back lid that is opened to load and unload said film cartridge and that is held closed by a releasable restraining mechanism, and comprising:

a first operating member operable from an initial position to an operating position;

a second operating member operable from an initial position to an operating position;

said drive means being operable to rewind film when both said operating members are in their operating positions;

a member operable to disengage said coupling from said spool shaft and to release the holding of said back lid by said restraining mechanism;

means for returning said first operating member to its initial position in association with the release of the holding of said back lid by said restraining mechanism; and means for returning said second operating member to its initial position in response to the operation of said member.

3. A camera according to claim 2, wherein said drive means includes an electric motor and a transmission mechanism provided between said motor and said coupling, and at least one of said first operating member and said second operating member has switch means for closing a circuit for supplying energy to said electric motor.

4. A camera according to claim 2, wherein said drive means includes an electric motor and a transmission mechanism provided between said motor and said coupling, and said second operating member controls said transmission mechanism so that when said second operating member is in its operating position, said transmission mechanism provides a driving connection between said motor and said coupling, and when said second operating member is in its initial position said transmission mechanism breaks said connection.

* * * * *